United States Patent
Cui et al.

(10) Patent No.: US 7,138,035 B2
(45) Date of Patent: Nov. 21, 2006

(54) PROCESS FOR THE SELECTIVE MODIFICATION OF CARBOHYDRATES BY PEROXIDASE CATALYZED OXIDATION

(75) Inventors: Xiaoyuan Cui, Belle Mead, NJ (US); A. Levent Cimecioglu, Princeton, NJ (US); Yong-Cheng Shi, Hillsborough, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 259 days.

(21) Appl. No.: 09/851,069

(22) Filed: May 8, 2001

(65) Prior Publication Data

US 2003/0029588 A1 Feb. 13, 2003

(51) Int. Cl.
*D21H 17/25* (2006.01)
*D21H 17/28* (2006.01)
*D06M 16/00* (2006.01)

(52) U.S. Cl. .............. 162/175; 162/176; 162/177; 162/72; 162/78; 435/275; 435/278; 536/124; 8/181

(58) Field of Classification Search .............. 162/72, 162/63, 70, 78, 158, 164.6, 168.2, 181.2, 162/175–177; 435/277, 278, 267; 510/305, 510/306, 320, 321, 322; 8/116.1, 181, 401; 524/27, 35, 47–49; 536/123.1, 124, 56, 102

See application file for complete search history.

(56) References Cited

U.S. PATENT DOCUMENTS

| 5,389,369 A | 2/1995 | Allen ................. 424/94.4 |
| 5,593,872 A | 1/1997 | Gabelman et al. .......... 435/147 |
| 5,795,855 A | 8/1998 | Schneider et al. ......... 510/376 |
| 5,866,392 A | 2/1999 | Schou et al. ............... 435/190 |
| 5,888,787 A | 3/1999 | Chen et al. ............... 435/147 |
| 6,023,000 A | 2/2000 | Fritz-Langhals et al. .... 588/320 |
| 6,069,282 A | 5/2000 | Fritz-Langhals et al. .... 568/320 |
| 6,080,573 A | 6/2000 | Convents et al. .......... 435/263 |
| 6,087,135 A | 7/2000 | Kierulff ..................... 435/101 |
| 6,103,059 A | 8/2000 | Call ............................ 182/65 |
| 6,242,245 B1 * | 6/2001 | Amann et al. ............. 435/277 |
| 6,251,386 B1 * | 6/2001 | Johansen ................... 424/94.4 |
| 6,503,507 B1 * | 1/2003 | Allen ........................ 424/94.4 |
| 6,824,645 B1 * | 11/2004 | Jaschinski et al. ............. 162/9 |
| 2001/0034442 A1 | 10/2001 | Bragd et al. ................ 536/102 |

FOREIGN PATENT DOCUMENTS

| WO | WO 92/09741 | 6/1992 |
| WO | WO 97/28257 | 8/1997 |
| WO | WO 99/23117 * | 5/1999 |
| WO | WO 99/23240 | 5/1999 |

(Continued)

OTHER PUBLICATIONS

Yaropolov, et al., "Laccase Properties, Catalytic Mechanism, and Applicability (EC 1.10.3.2)", *Applied Biochemistry and Biotechnology*, vol. 49, pp. 257-280, (1994).

(Continued)

*Primary Examiner*—Eric Hug
(74) *Attorney, Agent, or Firm*—Karen G. Kaiser

(57) ABSTRACT

The present invention relates to an environmentally friendly process for the selective oxidation of carbohydrates. The process comprises the addition of a hydroperoxide, including hydrogen peroxide, to a carbohydrate having primary alcohol groups, particularly including polysaccharides, wherein said carbohydrate is contact with a nitroxyl radical mediator and the process is catalyzed by a peroxidase enzyme in the presence of halide ions.

13 Claims, 1 Drawing Sheet

FOREIGN PATENT DOCUMENTS

| WO | WO 99/34009 | 7/1999 |
|---|---|---|
| WO | WO 99/54545 | 10/1999 |
| WO | WO 00/50463 | 8/2000 |
| WO | WO 00/50621 | 8/2000 |

OTHER PUBLICATIONS

Thomas, et al., "Oxidation of Bromide by the Human Leukocyte Enzymes Myeloperoxidase and Eosimophil Peroxidase", *The Journal of Biological Chemistry*, vol. 270, No. 7, pp. 2906-2913, (1995).

Platt, et al., "Singlet Oxygen Formation by a Peroxidase, $H_2O_2$ and Halide System", *Err. J. Biochem.*, vol., 93, pp. 323-332 (1979).

Biotechnology Notables, Biotechnology Progress in 1999, vol. 15, No. 2.

Vanysek, Peter, Electrochemical Series, *Handbook of Chemistry*, pp. 8-20—8-33.

Pittler, et. al. "Peroxidases", Methods in Enzymatic Analysis in 1983, vol. 3, pp. 286-293.

Xu, et. al., "Redox Chemistry in Laccase-Catalyzed Oxidation of N-Hydroxy Compounds", *Applied and Environmental Microbiology*, vol. 66, No. 5. pp. 2052-2056 (2000).

Van Deurzen, Marion, P.J., van Rantwijk, Fred, Sheldon, Roger A., "Selective Oxidations Catalyzed By Peroxidases". Tetrahedron Report No. 427. Laboratory of Organic Chemistry and Catalysis, Deift, University of Technology, Jullanataan 136,2628 Bl. Delft. The Netherlands. pp. 13183-13189.

\* cited by examiner

PROCESS FOR THE SELECTIVE MODIFICATION OF CARBOHYDRATES BY PEROXIDASE CATALYZED OXIDATION

FIELD OF THE INVENTION

The present invention relates to an environmentally friendly process for the selective oxidation of carbohydrates. The process comprises the addition of a hydroperoxide, including hydrogen peroxide, to a carbohydrate having primary alcohol groups, particularly including polysaccharides, wherein said carbohydrate is contact with a nitroxyl radical mediator and the process is catalyzed by a peroxidase enzyme in the presence of halide ions.

BACKGROUND OF THE INVENTION

The oxidation of carbohydrates by various nitroxide-mediating reagents are known in the art.

The use of nitroxyl radicals and nitrosonium salts to produce aldehydes and carboxylic acids particularly applied to the selective oxidation of primary alcohols in various carbohydrates to carbonyl and/or carboxylic acids has been reported. See "Selective Oxidation of Primary Alcohols Mediated by Nitroxyl Radical in Aqueous Solution. Kinetics and Mechanism" by A. E. J. de Nooy and A. C. Bessemer, in *Tetrahedron*, Vol. 51, No. 29, 1995, pp. 8023–8032; WO 95/07303 dated Mar. 16, 1995 to Bessemer et al.; and "Oxidation of Primary Alcohol Groups of Naturally Occurring Polysaccharides with 2,2,6,6-Tetramethyl-1-piperidine Oxoammonium Ion" by P. S. Chang and J. F. Robyt in *J. Carbohydrate Chemistry*, 15(7), 1996, pp. 819–830.

Unfortunately, many of these processes require the use of environmentally harmful chemical reagents. In addition, most oxidative methods are not selective and cause degradation of the carbohydrate and the formation of excess carboxyl groups. Excess carboxyl groups reduce the degree of aldehyde substitution and affect the cationic/anionic balance of the functional groups on the product. This is particularly undesirable in polysaccharides which are used in or as pulp suitable for papermaking and absorbent applications.

Accordingly, there remains a need for an environmentally friendly selective oxidation route to produce carbohydrate aldehyde derivatives having a suitable aldehyde content.

SUMMARY OF THE INVENTION

The present invention relates to an environmentally friendly process for the selective oxidation of carbohydrates. The process comprises the addition of a hydroperoxide, including hydrogen peroxide, to a carbohydrate having primary alcohol groups, particularly including polysaccharides, wherein said carbohydrate is contact with a nitroxyl radical mediator and the process is catalyzed by a peroxidase enzyme in the presence of halide ions.

In particular, the process involves the slow addition of hydrogen peroxide to a heterogeneous or homogeneous solution of a carbohydrate, particularly a polysaccharide, in contact with a 2,2,6,6,-tetramethylpiperidin-1-oxyl ("TEMPO") derivative, peroxidase enzyme, and halide, said solution being maintained at an appropriate pH and temperature.

Such a process provides a carbohydrate derivative in which the use of environmentally harmful chemicals, such as hypohalites, is minimized. Moreover, the aldehyde/carboxyl group balance on the carbohydrate may be manipulated to maximum effective levels by the process. This is particularly useful in producing polysaccharides which are used in or as pulp suitable for papermaking and absorbent applications.

BRIEF DESCRIPTION OF THE FIGURE

In FIG. 1, Y is H, OC(O)-alkyl, OH, or NHC(O)-alkyl; $R_1$, $R_2$, $R_3$ and $R_4$ represent the same or different alkyl groups of 1 to 18 carbon atoms; R' is H or alkyl; and X represents a halide.

DETAILED DESCRIPTION OF THE INVENTION

Figure 1:
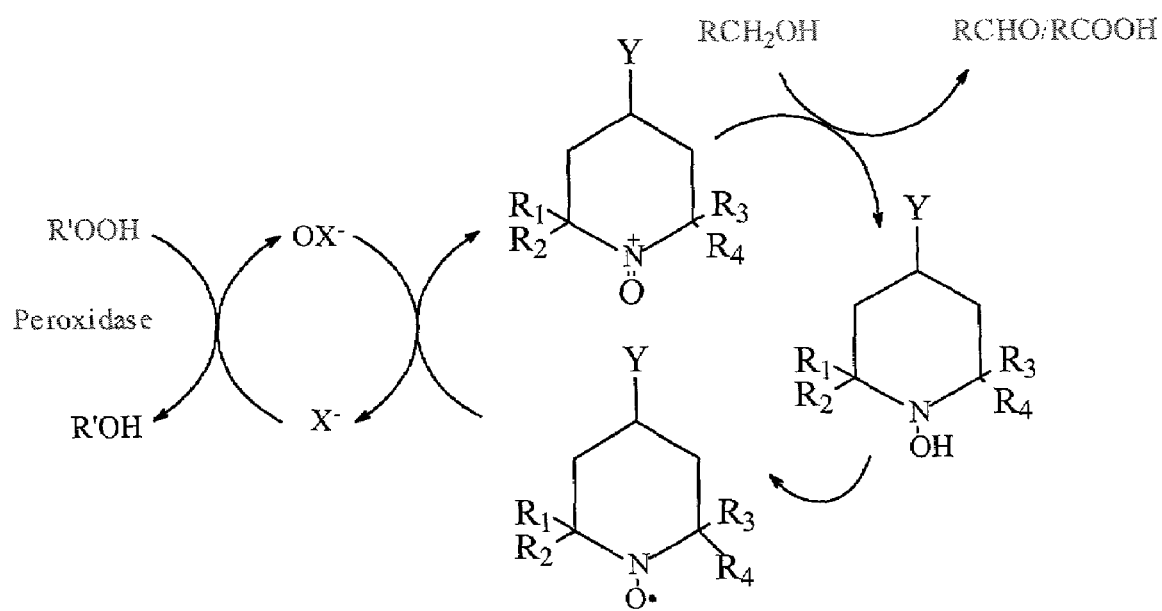
FIG. 1 is a diagram of the catalytic system of the present inventive process, which ultimately results in the oxidation of the carbohydrate's (represented in FIG. 1 by R) primary alcohols to aldehyde groups.

The present invention relates to an environmentally friendly process for the selective oxidation of carbohydrates. The process comprises the addition of hydrogen peroxide to a carbohydrate having primary alcohol groups, particularly including polysaccharides, wherein said carbohydrate is contact with a nitroxyl radical mediator and the process is catalyzed by a peroxidase enzyme in the presence of halide ions.

In particular, the process involves the slow addition of hydrogen peroxide to a heterogeneous or homogeneous solution of a carbohydrate, particularly a polysaccharide, in contact with a 2,2,6,6,-tetramethylpiperidin-1-oxyl ("TEMPO") derivative, peroxidase enzyme, and halide, said solution or slurry being maintained at an appropriate pH. The prepared products are highly selectively oxidized polysaccharides where there is a high level of C-6 aldehyde functionality.

When the carbohydrate is starch, all starches and flours (hereinafter "starch") may be suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties, thereof. As used herein, the term "waxy" is intended to include a starch or flour containing at least about 95% by weight amylopectin and the term "high amylose" is intended to include a starch or flour containing at least about 40% by weight amylose.

Also included are the conversion products derived from any of the starches including, for example, dextrins prepared by the hydrolytic action of acid and/or heat; fluidity or thin-boiling starches prepared by enzyme conversion or mild acid hydrolysis; and derivatized, crosslinked and thermally inhibited starches.

The starch may be modified with cationic, anionic, amphoteric, zwitterionic, hydrophobic and nonionic groups and combinations of such groups. It is preferred that the starch is modified with a cationic group. Cationization of the starch can be produced by well known chemical reactions with reagents containing groups such as amino, imino, ammonium, sulfonium or phosphonium groups as disclosed, for example in "Cationic Starches" by D. B. Solarek, in *Modified Starches: Properties and Uses*, Chapter 8, 1986 and in U.S. Pat. No. 4,119,487 issued Oct. 10, 1978 to M. Tessler. Such cationic derivatives include those containing nitrogen containing groups comprising primary, secondary, tertiary and quaternary amines and sulfonium and phosphonium groups attached through either ether or ester linkages. Particularly useful cationic starch derivatives are those containing amino or nitrogen groups having alkyl, aryl, alkaryl, aralkyl or cyclic substituents of 1 to 22 carbon atoms and especially 1 to 6 carbon atoms. Preferred derivatives are those containing tertiary amino and quaternary ammonium ether groups.

When the carbohydrate is a gum, the applicable base gums which may be used herein include polygalactomannans, which are heteropolysaccharides composed principally of long chains of -D-mannopyranosyl units to which single unit side chains of -D-galactopyranosyl units are joined. Also included are degraded gum products, resulting from the hydrolytic action of acid, heat, shear and/or enzyme, oxidized gums, and derivatized gums. The preferred gums include, guar, locust bean, tara and fenugreek gums. Other suitable carbohydrate bases that may be used in this invention include, but not limited to, pullulan, chitin, chitosan, gum arabic, agar, algin, carrageenan, xanthan, gellan, welan, rhamsan, curdlan scleroglucan, tamarind gum, and hemicelluloses such as arabinogalactans and corn fiber gum and their derivatives. A sample carbohydrate particularly useful in exemplifying polysaccharide model studies is methyl-glucopyranoside, ("MGP").

When the carbohydrate is cellulose, applicable bases useful herein include cellulose and modified cellulose, especially water soluble cellulose ethers, such as carboxymethylcellulose and alkyl and hydroxyalkylcelluloses, for example, methylcellulose, hydroxypropoylymethylcellulose, hydroxyethylcellulose, hydroxyethylmethylcellulose, hydroxybutylmethycellulose, and ethylhydroxyethylcellulose.

Methods for preparing modified carbohydrate bases are well known to those skilled in the art and discussed in the literature. See, for example, R. L. Whistler, Methods in Carbohydrate Chemistry, Vol. IV, 1964, pp. 279–311; R. L. Whistler et al, Starch Chemistry and Technology, Vol. II,1967, pp. 293–430, R. L. Whistler and J. N. Bemiller (Eds.), Industrial Gums 3$^{rd}$ Ed., 1993, Chapter 3, R. L. Davidson and N. Sittig, Water Soluble Resins, 2$^{nd}$ Ed., 1968, Chapter 2; and R. L. Davidson, Handbook of Water Soluble Gums and Resins, 1980.

The carbohydrate C-6 aldehydes prepared in accordance with this invention are obtained by a selective oxidation process. This oxidation reaction is carried out in an aqueous medium via the addition of hydrogen peroxide to a carbohydrate, particularly to a polysaccharide, in contact with a nitroxyl radical mediator, wherein said process is catalyzed by a peroxidase enzyme in the presence of halide ion under defined reaction conditions. The use of this process allows the manipulation of the aldehyde/carboxyl group balance on the carbohydrate to maximum effective levels, and is particularly useful in producing polysaccharides which are used in or as pulp suitable for papermaking and absorbent applications The nitroxyl radical mediator used herein is a di-tertiary alkyl nitroxyl radical. Any form of the nitroxyl radical mediator may be used, including polymeric and immobilized forms. The nitroxyl radical mediator used herein has one of the following formulas:

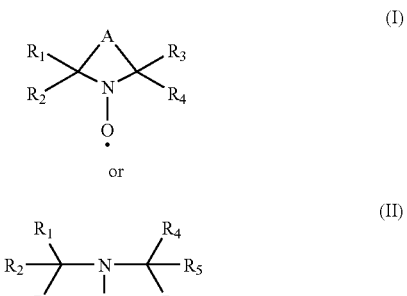

where A represents a chain of preferably two or three atoms, in particular carbon atoms or a combination of one or two carbon atoms with an oxygen or nitrogen atom, and the R groups represent the same or different alkyl groups. Chain A may be substituted by one or more groups such as alkyl, alkoxy, aryl, aryloxy, amino, amido or oxo groups, or by a divalent group or multivalent group which is bound to one or more other groups having formula I.

Particularly useful nitroxyl radicals are di-tertiary alkyl nitroxyl radicals having the formula:

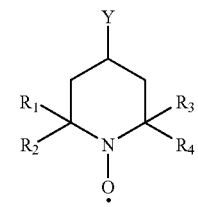

where Y is H, OH, O—C(O)-alkyl or NH—C(O)—CH$_3$ and each of the R groups represent the same or different alkyl groups of 1 to 18 carbon atoms and more particularly methyl groups. Nitroxyl radicals of this type include those where a) the R groups are all methyl (or alkyl of 1 carbon atom) and Y is H, i.e., 2,2,6,6-tetramethyl-1-piperdinyloxy (TEMPO); b) R groups are methyl and Y is OH and identified as 4-hydroxy-TEMPO; and c) R groups are methyl and Y is NH—C(O)—CH$_3$ and identified as 4-acetamido-TEMPO. The preferred nitroxyl radical is TEMPO or 4-acetamido-TEMPO ("4-AT").

The nitroxyl radical is used in an effective amount to mediate the oxidation, particularly from about 0.001 to 20 mole %, and more particularly from about 0.01 to 5 mole % based on the moles of carbohydrate. Where the carbohydrate is a polysaccharide the weight percents would be based on the moles of polysaccharide anhydrosugar unit ("ASU"). The nitroxyl radical can be added to the reaction mixture or generated in situ from the corresponding hydroxylamine or oxoammonium salts.

The enzyme oxidant used in this invention can be any peroxidase enzyme capable of converting halide ions, particularly chloride and bromide, to the corresponding hypohalite in the presence of hydrogen peroxide. Peroxidases are enzymes which catalyze oxidative reactions using hydrogen peroxide as their primary oxidant. Particularly useful peroxidases include, lactoperoxidase ("LPO"), myeloperoxidase ("MPO"), eosinophil peroxidase ("EPO"), thyroid peroxidase ("TPO"), ovoperoxidase, salivary peroxidase, and vanadium haloperoxidase. This list of enzymes is only illustrative and is not intended to be exhaustive.

The oxidation reaction may be carried out by adding hydrogen peroxide to a heterogeneous or homogeneous solution of the carbohydrate containing a mediating amount of nitroxyl radical, halide and peroxidase enzyme. The halide may be added as a salt. The addition of hydrogen peroxide must be slow and controlled. The pH of the reaction mixture is maintained between about 3 to about 9, preferably about 4.5 and about 7.5 by the slow addition of base, preferably sodium hydroxide. The temperature of the reaction mixture is maintained between about 10 to about 70° C., preferably between about 20 to about 50° C. The amount of nitroxyl radical mediator used is between about 0.01 to about 50 wt%, preferably between about 0.1 to about 20 wt% by weight of the carbohydrate. Where the carbohydrate is a polysaccharide, all weight percent will be by weight of the polysaccharide ASU. After the carbohydrate reaches the desired oxidation level, as determined by back-titration with hydroxylamine or $C^{13}$ NMR, excess hydrogen peroxide is quenched, and the oxidized carbohydrate is isolated from the reaction mixture.

The oxidized carbohydrate will have C-6 aldehyde groups in amounts of up to about 15 mole %, and more particularly from about 1 to 15 mole % based on the moles of carbohydrate. If desired, the oxidized carbohydrate may be further modified by techniques known in the art.

FIG. 1 illustrates the mechanism by which the process proceeds. Initially, the hydroperoxide oxidizes the halide ion to the corresponding hypohalite using a peroxidase enzyme as a catalyst. The hypohalite thus formed oxidizes the nitroxyl radical mediator into its active form, the corresponding nitrosonium ion. The nitrosonium ion then oxidizes primary alcohols to aldehydes, while concurrently being reduced and subsequently reforming the inactive form of the nitroxyl radical mediator. The inactive form of the nitroxyl radical mediator may again be re-oxidized by hypohalite in the system. Accordingly, as illustrated in FIG. 1, there are two catalytic cycles involved in the oxidation process, one involving the regeneration of the hypohalite and another involving regeneration of the nitrosonium ion, the active form of the nitroxyl radical mediator.

The oxidized carbohydrates ("aldehyde derivatives") produced via the present invention are particularly useful in or as pulp suitable for papermaking and absorbent applications. For example, polysaccharide aldehyde derivatives may be used as beater additives, although their addition to the pulp may occur at any point in the papermaking process prior to the ultimate conversion of the wet pulp into a dry web or sheet. Thus, for example, they may be added to the pulp while the latter is in the hydropulper, beater, various stock chests or headbox. The derivative may also be sprayed or applied onto the wet web either as a dispersion or uncooked slurry. It is also envisioned that the aldehyde derivatives of this invention can be applied to the already formed paper sheet as such on machine applications as size press, calender stack or via off machine coating processes. The oxidized carbohydrates of this invention may also be used in conjunction with other paper additives known in the art. The oxidized carbohydrates of this invention may advantageously to used in or as paper products including tissue, towel, paper and paperboard articles.

The oxidized carbohydrates may effectively be used for addition to or as pulp prepared from any type of cellulosic fibers, synthetic fibers or combinations thereof. Among the cellulosic materials which may be used are bleached and unbleached soda, neutral sulfite, semi-chemical chemi-ground wood, ground wood or any combinations of these fibers. Fibers of the viscous rayon or regenerated cellulose type may also be used as well as recycled waste paper, if desired.

The oxidized carbohydrates of the present invention may also be used in or as "fluffed pulp". "Fluffed pulp" is useful in absorbent applications. The fluffed pulp of this invention provides a variety of desirable properties, including, for example, odor reduction, improved absorbency under saline conditions, and a reduction or elimination of the use of superabsorbent polymers in absorbent articles. Such articles include, without limit, diapers (disposable, training pants, all suitable for adult and child products), catamenials, and feminine care and/or hygiene products (including sanitary napkins, tampons, liners, etc.), medical or surgical dressings (including bandages, wipes, sponges, drapes, clothing, bed pads, etc.) food (including meat) packaging pads, liners or casings, humidity or odor removing filters, insulation (against moisture, heat or acoustic problems), agricultural materials needing to retain moisture, and tissue and towel applications

EXAMPLES

The following examples are presented to further illustrate and explain the present invention and should not be taken as limiting in any regard. All percents used are on a weight/weight basis.

Example 1

Oxidation of 4-acetamido-TEMPO ("4-AT") to the Nitrosonium Ion

4-AT (0.1 g, widely commercially available) and NaBr (0.5 g) was dissolved in water (25 ml) and the absorbance of the solution at 340 nm was measured in a spectrophotometer. After adding ascorbic acid (0.044 g), the yellow color of the solution almost disappeared and absorbance of the solution recorded. Then, the enzyme LPO (0.4 ml) was added to the solution. Accordingly, the absorbance of the solution increased slightly due to the color of the enzyme. Finally, hydrogen peroxide was added to the solution, until the color of the solution returned to yellow.

TABLE 1

Absorbance readings of the 4-AT, reduced 4-AT and re-oxidized 4-AT

| Sample | ABS at 430 nm |
| --- | --- |
| 0.1 g of 4-AT (9.4 mM) and 0.5 g of NaBr | 0.330 |
| Plus 0.044 g of ascorbic acid (4.7 mM) | 0.104 |
| Plus 240 units of LPO | 0.150 |
| Plus 2.5 ml of 0.5% $H_2O_2$ | 0.317 |

The data reported in Table 1 indicates that LPO does catalyze the oxidation of the reduced 4-AT to the corresponding nitrosonium ion by hydrogen peroxide in the presence of sodium bromide. In contrast, under the same conditions, but leaving out the LPO enzyme, 4-AT was not oxidized.

Example 2

Oxidation of Methyl-Glucopyranoside, ("MGP")

MGP (7.5 g, widely commercially available), 4-AT (25 mg), NaBr (1 g), and LPO (5 mg, 600 units from Sigma, L-8257) were added to water (deionized, 50 ml) and dissolved. The mixture was incubated at room temperature and $H_2O_2$ (0.9%) was slowly added (30 µl/min). The pH of the reaction was initially increased from 5.0 to 6.4, then decreased (due to the formation of carboxyl groups) and maintained at 6.0 by the slow addition of NaOH (0.1 M) solution. After three hours, excess $H_2O_2$ was destroyed by the addition of 2% catalase (1 ml). Based on titration with hydroxylamine (3.2 ml of 0.2 N NaOH), the aldehyde content of the 50 g of the MGP sample (5.9 g of MGP) was calculated to be 1 mole % based on MGP. Table 2 summarizes the results.

TABLE 2

Results from LPO catalyzed aldehyde formation

| $H_2O_2$ | LPO | NaBr | 4-AT | Aldehyde Formation |
|---|---|---|---|---|
| + | + | + | + | Yes |
| + | − | + | + | No |
| + | + | − | + | No |
| + | + | + | − | No |

+: presence; −: absence

Oxidation of the MGP to the aldehyde occurred exclusively at the C-6 position. Both the position of the aldehyde group and aldehyde content were confirmed by carbon-13 NMR. No significant oxidation was observed when NaBr, LPO or 4-AT were individually absent. Additionally, if hydrogen peroxide was added all in one portion at the beginning of the reaction, no significant oxidation occurred.

In conclusion, MGP aldehyde was formed in the presence of LPO, NaBr and 4-AT, but only if the hydrogen peroxide was controlled and added slowly.

Example 3

Manipulation of Oxidation Level

A simple carbohydrate, ("MGP"), was oxidized by slow addition of hydrogen peroxide under various conditions via the procedure described in Example 2 at a constant sodium bromide concentration (1g). The reaction conditions and resultant aldehyde content of the MGP are reported in Table 3.

TABLE 3

MGP oxidation results

| MGP (%) | LPO (units/g MGP) | 4-AT (% on MGP) | Time (hr) | Addition rate of $H_2O_2$ | Aldehyde (mole %) |
|---|---|---|---|---|---|
| 7.5 g (13) | 80 | 0.33 | 3.0 | 30 µl/min (0.9%) | 1.0 |
| 7.5 g (13) | 80 | 1.0 | 3.0 | 30 µl/min (0.9%) | 1.6 |
| 7.5 g (13) | 160 | 1.33 | 16.6 | 30 µl/min (0.5%) | 2.4 |

The data in the last row of Table 3 indicated that the formation of 2.4% MGP aldehyde (0.93 mmol) required only 100 mg of 4-AT (0.47 mmol). This indicated that 4-AT was oxidatively cycled.

Example 4

Oxidation of Starch

Amioca starch (50 g) was added to water (200 ml, deionized) in which 4-AT (0.5 g), NaBr (0.5 g) and LPO (20 mg, 4×600 units from Sigma, L-8257) were dissolved. The mixture was incubated at room temperature at an initial pH at 5.3, and 0.5% $H_2O_2$ was slowly added (30 µl/min). The pH of the reaction was initially increased from 5.3 to 6.5 and maintained at 6.5 by the slow addition of NaOH (0.1 N). After 20 hours, 0.56 ml of 0.1 N NaOH was consumed. The starch slurry was then filtered and starch cake was re-slurried in water 4 times (200 ml each) until no detectable hydrogen peroxide remained in the filtrate.

The sample was air-dried. Then, 5 g of the oxidized amioca starch was titrated with hydroxylamine and 1.07 ml of 0.1 N NaOH was consumed. The calculated aldehyde content was 0.34%. Thus, starch as well as MGP may be oxidized.

Example 5

Effect of Peroxidase Source on the Oxidation

Other peroxidases, in addition to lactoperoxidase (LPO), such as myeloperoxidase (MPO), horseradish peroxidase (HRPO) and soybean peroxidase (SBPO) were evaluated for their ability to oxidize MGP according to the process described in Example 1. The data concerning these experiments are reported in Table 4.

TABLE 4

Effect of Peroxidase Source on the Formation of MGP Aldehyde Groups

| Peroxidase | Quantity | Activity (units) | Aldehyde Formation |
|---|---|---|---|
| LPO | 5 mg | 600 | Yes |
| MPO | 0.14 mg | 120 | Yes |
| HRPO | 25 mg | 6000 | No |
| SBPO | 10 mg | 1000 | No |

According to the results reported in Table 4, peroxidases obtained from animal (LPO and MPO) and plant (HRPO and SBPO) sources have distinct differences. Although lactoperoxidase and horseradish peroxidase belong to the same enzyme family (EC 1.11.1.7), only the peroxidases isolated from an animal source oxidize polysaccharides when used in the present inventive process.

We claim:
1. A method of oxidizing carbohydrates having primary alcohol groups, the method comprising the steps of:
   placing a nitroxyl radical mediator, halide and peroxidase enzyme in solution
   with the carbohydrates, and
   adding a hydroperoxide to the solution containing carbohydrates thereby oxidizing the carbohydrates.

2. The method of claim 1 wherein the hydroperoxide is hydrogen peroxide.

3. The method of claim 1 wherein the carbohydrate is a polysaccharide.

4. The method of claim 3 wherein the polysaccharide is selected from the group consisting of starch and cellulose pulp.

5. The method of claim 1 wherein the nitroxyl radical mediator is a di-tertiary alkyl nitroxyl radical has a formula selected from the group consisting of:

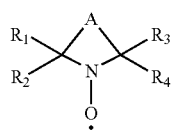

(I)

and

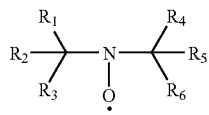

(II)

wherein A represents a chain of preferably two or three atoms, in particular carbon atoms or a combination of one or two carbon atoms with an oxygen or nitrogen atom, and the R groups represent the same or different alkyl groups.

6. The method of claim 5 wherein the nitroxyl radical mediator has the formula:

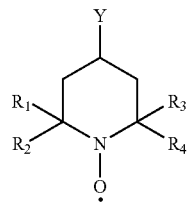

where Y is H, OH, O—C(O)—CH, or NH—C(O)—CH$_3$.

7. The method of claim 2 wherein the peroxidase enzyme is derived from an animal source.

8. The method of claim 2 wherein the peroxidase enzyme is selected from the group consisting of lactoperoxidase ("LPO"), myeloperoxidase ("MPO"), eosinophil peroxidase ("EPO"), thyroid peroxidase ("TPO"), ovoperoxidase, salivary peroxidase, and vanadium haloperoxidase.

9. The method of claim 1 wherein the halide ion is bromide.

10. The method of claim 1 wherein the peroxidase enzyme is LPO; the temperature of the reaction is kept between about 10° C to about 70° C the pH is between about 3.0 to about 9.0; and the nitroxyl radical mediator is present in an amount of between about 0.01 to about 50 wt % by weight of the carbohydrate.

11. The method of claim 10 wherein the temperature of the reaction is kept between about 20° to about 50° ; the pH is between about 4.5 to about 6.5; and the nitroxyl radical mediator is present in an amount of between about 0.1 to about 20 wt % by weight of the carbohydrate.

12. The method according to claim 1 wherein the hydroperoxide oxidizes the halide to its corresponding hypohalite by catalytic action of the peroxidase enzyme, and
wherein the hypohalite oxidizes the nitroxyl radical mediator to its corresponding nitrosonium ion.

13. The method according to claim 12 wherein the nitrosonium ion oxidizes primary alcohols of the carbohydrates to aldehydes.

* * * * *